US012730948B2

(12) United States Patent
Das et al.

(10) Patent No.: US 12,730,948 B2
(45) Date of Patent: Sep. 8, 2026

(54) METHOD AND DEVICE FOR DYNAMIC FAILURE MODE EFFECT ANALYSIS AND RECOVERY PROCESS RECOMMENDATION FOR CLOUD COMPUTING APPLICATIONS

(71) Applicant: Accenture Global Solutions Limited, Dublin (IE)

(72) Inventors: Sankar Narayan Das, Barrackpore (IN); Kuntal Dey, Birbhum (IN); Kapil Singi, Bangalore (IN); Vikrant Kaulgud, Pune (IN); Manish Ahuja, Bengaluru (IN); Reuben Rajan George, Enathu (IN); Mallika Fernandes, Bangalore (IN); Mahesh Venkata Raman, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 827 days.

(21) Appl. No.: 18/130,767

(22) Filed: Apr. 4, 2023

(65) Prior Publication Data

US 2023/0315954 A1 Oct. 5, 2023

(51) Int. Cl.
*G06F 30/27* (2020.01)
*G06F 119/02* (2020.01)

(52) U.S. Cl.
CPC .......... *G06F 30/27* (2020.01); *G06F 2119/02* (2020.01)

(58) Field of Classification Search
CPC ............................. G06F 30/27; G06F 2119/02
USPC ............................................................ 703/14
See application file for complete search history.

(56) References Cited

PUBLICATIONS

Jishan Ahmed, et. al. Predicting severely imbalanced data disk drive failures with machine learning models, Machine Learning with Applications 9 (2022) 100361, pp. 1-12 (Year: 2022).*
Oliveira, J. et al., "Failure Mode and Effect Analysis for Cyber-Physical Systems," Future Internet, vol. 12, No. 11, 205, 18 pages, 2020.
Ali, N. et al., "Failure detection and prevention for cyber-physical systems using ontology-based knowledge base," Computers, vol. 7, No. 4, 68, 16 pages, 2018.
Qin, J. et al., "Failure mode and effects analysis (FMEA) for risk assessment based on interval type-2 fuzzy evidential reasoning method," Applied Soft Computing, vol. 89, 106134, 14 pages, 2020.

* cited by examiner

*Primary Examiner* — Justin C Mikowski
(74) *Attorney, Agent, or Firm* — Seed Intellectual Property Law Group LLP

(57) ABSTRACT

Aspects of the present disclosure provide methods, devices, and computer-readable storage media that support detection, effect monitoring, and recovery from failure modes in cloud computing application using a failure mode effect analysis (FMEA) engine. Historical metadata related to operation of a hierarchy of devices may be used as training data to train the FMEA engine to identify failure modes experienced by the hierarchy of devices. After training the FMEA engine, metadata from the hierarchy of devices may be input to the FMEA engine to identify a failure mode that may have occurred, and the FMEA engine may select a recovery process to recommend for addressing or mitigating the identified failure mode. In some implementations, the FMEA engine may output an indication of the recommended recovery process and/or initiate performance of one or more operations at the hierarchy of devices to recover from the failure event.

18 Claims, 4 Drawing Sheets

Application 202

Metadata Analyzer 204

Failure Mode Detector 206

Recovery Process Manager 208

Failure Mode Analyzer 210

Failure Mode Risk Estimator 212

Metadata Repository 214

Failure Mode Database 216

Knowledgebase 218

252

254

256

258

259

260

262

300

| Component ID 302 | Timestamp 304 | Component Category 306 | Highest Priority Failure Mode 308 | RPN 310 | Short-term Trend 312 | | Long-term Trend 322 | | High-priority Trend 332 | |
|---|---|---|---|---|---|---|---|---|---|---|
| | | | | | Frequency | MTBF | Frequency | MTBF | Frequency | MTBF |
| First Gateway 172 | T_i | Network Component | Delay | 140 | (4, 6) | (3, 8) | (2.5, 4) | (2, 3) | | |
| S1 (First Gateway 172) | T_i | Service | Delay | 98 | (2, 3) | (1.2, 2) | (2.1, 3) | (2, 3) | | |
| S1 (Second Gateway 174) | T_i | Service | Delay | 96 | (2.1, 3) | (1.3, 2) | (2, 2.9) | (2, 3) | | |
| S2 | T_i | Service | Delay | 112 | (5, 8) | (4, 4) | (3, 4) | (2, 3) | | |
| L4 | T_i | Communication Link | Unavailability | 82 | 2, 3) | (1.2, 2) | (2.1, 3) | (2, 3) | | |
| L5 | T_i | Communication Link | Unavailability | 86 | (2.1, 3) | (1.3, 2) | (2.2, 9) | (2, 3) | | |
| First Gateway 172 | T_(i+1) | Network Component | Delay | 142 | | | (2.5, 4) | (2, 3) | (4.1, 2) | (2.8, 3.3) |
| S1 (First Gateway 172) | T_(i+1) | Service | Delay | 98 | (2.1, 3) | (1.4, 2) | (2.1, 3) | (2, 3) | | |
| S1 (Second Gateway 174) | T_(i+1) | Service | Delay | 96 | (2.3, 3) | (1.3, 2) | (2, 2.9) | (1.3, 2) | | |
| S2 | T_(i+1) | Service | Delay | 108 | | | (3, 4) | (3, 2) | (4.8, 2.3) | (4, 2) |
| L4 | T_(i+1) | Communication Link | Unavailability | 82 | (1.8, 3) | (1.2, 2) | (2.1, 3) | (1.2, 2) | | |
| L5 | T_(i+1) | Communication Link | Unavailability | 86 | (2.1, 3) | (1.3, 2) | (2, 2.9) | (1.3, 2) | | |

*FIG. 3*

Default Monitoring

Enhanced Monitoring

METHOD AND DEVICE FOR DYNAMIC FAILURE MODE EFFECT ANALYSIS AND RECOVERY PROCESS RECOMMENDATION FOR CLOUD COMPUTING APPLICATIONS

CROSS-REFERENCE TO RELATED APPLICATIONS

The present application claims the benefit of priority from Indian Provisional Application No. 202241020454, filed Apr. 5, 2022, the disclosure of which is incorporated by reference herein in its entirety.

TECHNICAL FIELD

The present disclosure relates generally to detection of and recovery from failure modes, and more particularly to dynamic detection of, effect monitoring of, and recovery from failure modes for cloud computing applications.

BACKGROUND

Cloud computing applications may use multiple devices to transmit, receive, process, and store data. For example, a network of Internet-of-things (IoT) devices may collect data and may transmit the data to one or more other devices, such as a primary device. The primary device may transmit the data to one or more other devices, such as a cloud storage device. Further, in some cloud computing applications, additional devices may be used to perform other operations, such as pre-processing or post-processing of data, network security or authentication, or other operations. An example of a cloud computing application is a cloud continuum application, which may include heterogeneous devices or infrastructure and which may encompass a range of services and devices from edge devices to public cloud services, including devices and services in-between, and integrated by one or more cloud-first networks.

A failure event of a cloud computing application or cloud continuum application may be disruptive to operation of a system. For example, disruption may occur due to latency, failure, or unavailability of a device or a communication link. In some cases, data or messages may be dropped, resulting in data loss. In the case of a cloud continuum application, failure events may be particularly disruptive. For example, different failure events in a cloud continuum application may reduce synergy between heterogeneous components of a cloud continuum application. Further, the failure events may change over time and location in a dynamic cloud continuum application, which may be dynamic in nature (e.g., where a number or type of components of the cloud continuum application is dynamic).

Conventional information technology (IT) solutions may attempt to manage or mitigate failure events in cloud computing applications or cloud continuum applications. For example, in response to a failure event, one or more IT personnel may attempt to analyze system information (e.g., logs of network activity) to identify a cause of the failure event and to initiate one or more operations to address the failure event. Analyzing the system information and selecting the operations to address the failure event may be relatively time-intensive and expensive. Further, such conventional solutions may be infeasible or ineffective in some environments, such as in a dynamic cloud continuum application with a heterogeneous and dynamic topology spread out across a number of different devices and services over a wide geographic area.

SUMMARY

Aspects of the present disclosure provide methods, devices, and computer-readable storage media that support detection, effect monitoring, and recovery from failure modes in cloud computing application using a failure mode effect analysis (FMEA) engine. For example, historical metadata may be collected that is related to operation of a hierarchy of devices associated with a cloud computing application, such as a cloud continuum application, including operation during one or more failure modes. The historical metadata may be used as training data to train the FMEA engine to identify failure modes experienced by the hierarchy of devices based on input operational metadata. After training the FMEA engine, metadata from the hierarchy of devices may be input to the FMEA engine to identify if, and which, failure modes correspond to the input metadata, and are thereby being experienced by the hierarchy of devices. The failure mode(s) may be monitored and prioritized, as further described herein. Additionally, the FMEA engine may select a recovery process from one or more candidate recovery processes that correspond to the identified failure modes to recommend for addressing or mitigating the identified failure modes. In some implementations, the FMEA engine may output an indication of the recommended recovery process and/or initiate performance of one or more operations at the hierarchy of devices to recover from the failure event.

In some aspects of the disclosure, the FMEA engine may perform or enable dynamic monitoring and evaluation of failure modes of a cloud continuum application. For example, the FMEA engine may perform on-the-fly adoptions to changes of system parameters, such as data ingestion rates, data processing rates, data types, and selection of data analytics processes, at the cloud continuum application. The FMEA engine may identify the changes in system parameters based on contexts and changes-of-context associated with the cloud continuum application. Further, due to the dynamic monitoring, a type and granularity of an output of the FMEA engine may vary over time. The FMEA engine may recommend efficient recovery processes by estimating and comparing the efficiencies of different candidate recovery processes, such as based on a knowledgebase that is determined at least in part on the metadata.

To further illustrate, the FMEA engine may be selectively configured (or "customized") based on the particular context information associated with a cloud continuum application and deployment details, such as the particular number or type of devices included in the hierarchy of devices or the particular number or type of communication links associated with the hierarchy of devices. The FMEA engine may perform data-driven failure analysis and quantified risk analysis of the plurality of failure modes and may be application and deployment specific in some implementations. Further, the FMEA engine may be dynamically modified based on risk factors of the plurality failure modes, such as by identifying a higher risk failure mode and tagging the higher risk failure mode for enhanced monitoring. The FMEA engine may analyze the plurality of recovery processes to recommend an efficient recovery process based at least in part on the particular time or operating state associated with the observed failure event or the proposed recovery process. For example, the FMEA engine may recommend a recovery process that results in less of an increase (or no increase) in computational load as compared to one or more other candidate recovery processes. As another example, the FMEA engine may recommend a recovery process that results in less of an increase (or no increase) in latency or delay as compared to one or more other candidate recovery processes.

One or more features described herein may improve system operation as compared to conventional failure mode monitoring and response techniques. For example, by training the FMEA engine based on the metadata using one or more techniques described herein, and by comparing efficiencies of multiple recovery processes (e.g., for a particular time or operating state of a system), recovery from a failure mode may be enhanced. To illustrate, recovery may be enhanced by recommending a recovery process that results in less of an increase in computational load or latency as compared to one or more other candidate recovery processes due to specific context or deployment of the cloud continuum application, which may not be known or may be too detailed to be used by information technology (IT) personnel that perform conventional failure mode analysis and troubleshooting.

In a particular aspect, a method for determining a recovery process associated with a cloud computing application failure mode includes receiving, by one or more processors, historical metadata associated with a hierarchy of devices associated with a cloud computing application. The method further includes providing, by the one or more processors, the historical metadata as training data to one or more machine learning (ML) applications to train the one or more ML applications to determine one or more failure modes associated with the hierarchy of devices based on the input metadata. The method further includes providing, by the one or more processors, second metadata associated with the hierarchy of devices as input to the one or more ML applications to determine a failure mode occurring at one or more of the hierarchy of devices. The method further includes determining, by the one or more processors based on the failure mode and the second metadata, a recommended recovery process that corresponds to the failure mode and outputting, by the one or more processors, a message indicating the recommended recovery process.

In another particular aspect, a device for determining a recovery process associated with a cloud computing application failure mode includes a memory and one or more processors communicatively coupled to the memory. The one or more processors configured to receive historical metadata associated with a hierarchy of devices associated with a cloud computing application and to provide the historical metadata as training data to one or more ML applications to train the one or more ML applications to determine one or more failure modes associated with the hierarchy of devices based on the input metadata. The one or more processors are further configured to provide second metadata associated with the hierarchy of devices as input to the one or more ML applications to determine a failure mode occurring at one or more of the hierarchy of devices. The one or more processors are further configured to determine, based on the failure mode and the second metadata, a recommended recovery process that corresponds to the failure mode and to output a message indicating the recommended recovery process.

In another particular aspect, a non-transitory computer-readable storage medium stores instructions that, when executed by one or more processors, cause the one or more processors to perform operations for determining a recovery process associated with a cloud computing application failure mode. The operations include for determining a recovery process associated with a cloud computing application failure mode includes receiving, by one or more processors, historical metadata associated with a hierarchy of devices associated with a cloud computing application. The operations further include providing, by the one or more processors, the historical metadata as training data to one or more ML applications to train the one or more ML applications to determine one or more failure modes associated with the hierarchy of devices based on the input metadata. The operations further include providing, by the one or more processors, second metadata associated with the hierarchy of devices as input to the one or more ML applications to determine a failure mode occurring at one or more of the hierarchy of devices. The operations further include determining, by the one or more processors based on the failure mode and the second metadata, a recommended recovery process that corresponds to the failure mode and outputting, by the one or more processors, a message indicating the recommended recovery process.

The foregoing has outlined rather broadly the features and technical advantages of the present disclosure in order that the detailed description that follows may be better understood. Additional features and advantages will be described hereinafter which form the subject of the claims of the disclosure. It should be appreciated by those skilled in the art that the conception and specific aspects disclosed may be readily utilized as a basis for modifying or designing other structures for carrying out the same purposes of the present disclosure. It should also be realized by those skilled in the art that such equivalent constructions do not depart from the scope of the disclosure as set forth in the appended claims. The novel features which are disclosed herein, both as to organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following descriptions taken in conjunction with the accompanying drawings, in which:

FIG. 3 is a diagram of an example of data that supports determining failure mode identification and recovery process recommendation according to one or more aspects.

It should be understood that the drawings are not necessarily to scale and that the disclosed aspects are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular aspects illustrated herein.

DETAILED DESCRIPTION

Aspects of the present disclosure provide systems, methods, apparatus, and computer-readable storage media that support determining a recovery process associated with a failure mode. A system of the present disclosure may collect historical metadata that is related to operation of a hierarchy of devices associated with a cloud computing application, such as a cloud continuum application, including operation during one or more failure modes. The historical metadata may be used as training data to train a failure mode effect analysis (FMEA) engine to identify failure modes experienced by the hierarchy of devices based on input operational metadata. After training the FMEA engine, metadata from the hierarchy of devices may be input to the FMEA engine to identify if, and which, failure modes correspond to the input metadata, and are thereby being experienced by the hierarchy of devices. The systems described herein may improve accuracy of failure mode detection and recovery process selection, such as by enabling comparison of multiple candidate recovery processes that may be implemented to mitigate effects of a failure event. Due to the improved accuracy of failure mode detection and recovery mode selection, the systems and methods of the present disclosure may provide automated, real time failure mode detection and recovery process selection while reducing disadvantageous effects on the system or network. For example, by training the FMEA engine based on the metadata using one or more techniques described herein, and by comparing efficiencies of multiple recovery processes (e.g., for a particular time or operating state of a system), recovery from a failure mode may be enhanced. To illustrate, recovery may be enhanced by recommending a recovery process that results in less of an increase (or no increase) in computational load or latency as compared to one or more other candidate recovery processes due to specific context or deployment of the cloud continuum application, which may not be known or may be too detailed to be used by information technology (IT) personnel that perform conventional failure mode analysis and troubleshooting.

Figure 1:
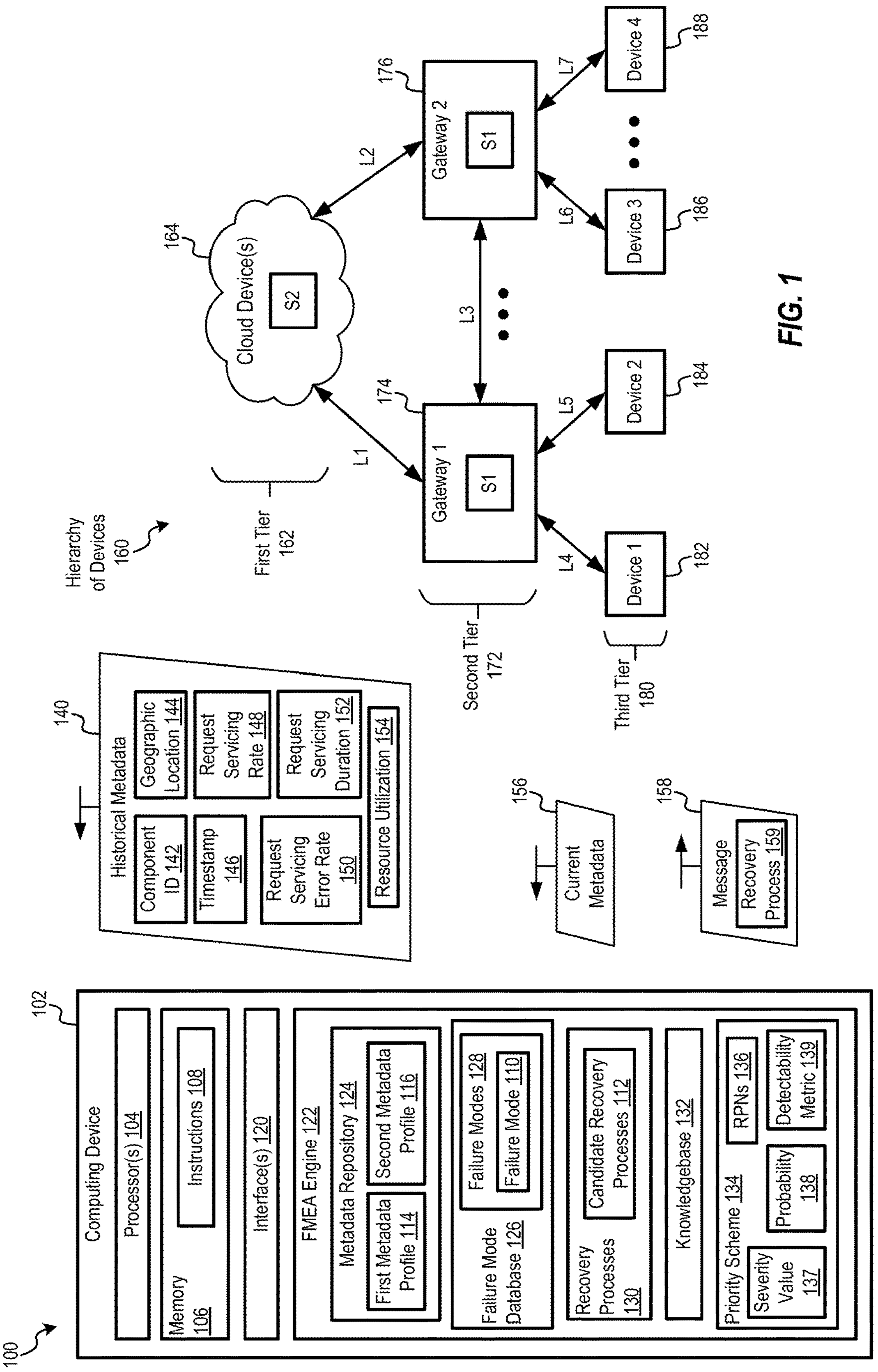
FIG. 1 is a block diagram of an example of a system that supports failure mode identification and recovery process recommendation associated with a cloud computing application according to one or more aspects.

Referring to FIG. 1, an example of a system that supports failure mode identification and recovery process recommendation associated with a cloud computing application according to one or more aspects is shown as a system 100. The system 100 may be configured to perform a recovery process associated with a cloud computing application failure mode. As shown in FIG. 1, the system 100 may include a computing device 102 and a hierarchy of devices 160 associated with a cloud computing application. The cloud computing application may include a cloud continuum application, which may include or may be associated with heterogeneous devices or heterogeneous infrastructure. For example, the cloud continuum application may include or may be associated with private cloud infrastructure, cloud enabled edge-computing infrastructure, and public cloud infrastructure, which may be integrated via one or more cloud-first networks, as illustrative examples.

In comparison to an on-premises infrastructure, cloud infrastructure (i.e., cloud computing infrastructure) may have a higher ratio of virtual resources to physical resources (e.g., a higher ratio of virtual machines to physical machines). For example, the ratio of virtual resources (e.g., machines) to physical resources may be at least 10:1, at least 20:1, or at least 30:1 in the cloud computing infrastructure. In contrast, on-premises computing infrastructure may have less than four virtual resources (e.g., machines) per physical resource. Public cloud (computing) infrastructure may involve sharing hardware, storage and/or network resources among multiple organizations or tenants. Services and data may be accessed and managed using a web browser or application ("app"). Private cloud (computing) infrastructure may include resources exclusively used by one organization or group of users. In comparison to public cloud infrastructure, private cloud infrastructure may provide more flexibility and control, however, private cloud infrastructure may be more expensive. In both cases, public and private cloud computing infrastructure may be hosted by a service provider. Edge computing or cloud-enabled edge computing may refer to computing independent of cloud infrastructure, e.g., on-premises computing. Edge computing may be carried out at the edge of an on-premises computer network. More specifically, edge computing may be carried out by an edge device, such as a network access device, edge server (e.g., network gateway), router, routing switch, integrated access device, multiplexer, metropolitan area network access device, wide area network access device, or the like.

The computing device 102 (e.g., an electronic device or a monitoring station) may include or correspond to a server, a desktop computing device, a laptop computing device, a personal computing device, a tablet computing device, a mobile device (e.g., a smart phone, a tablet, a personal digital assistant (PDA), a wearable device, and the like), a virtual reality (VR) device, an augmented reality (AR) device, an extended reality (XR) device, a vehicle (or a component thereof), an entertainment system, other computing devices, or a combination thereof, as non-limiting examples. The computing device 102 includes one or more processors 104, a memory 106, and one or more communication interfaces 120. The computing device 102 may execute one or more machine learning (ML) applications (e.g., using the one or more processors 104). In some examples, the one or more ML applications may correspond to or may be integrated in a failure mode effect analysis (FMEA) engine 122.

In some other implementations, one or more additional components (not shown) may be included in the computing device 102, such as one or more cloud servers, one or more edge devices, one or more IoT devices or the like. It is noted that functionalities described with reference to the computing device 102 are provided for purposes of illustration, rather than by way of limitation and that the exemplary functionalities described herein may be provided via other types of computing resource deployments. For example, in some implementations, computing resources and functionality described in connection with the computing device 102 may be provided in a distributed system using multiple servers or other computing devices, or in a cloud-based system using computing resources and functionality provided by a cloud-based environment that is accessible over a network. To illustrate, one or more operations described herein with reference to the computing device 102 may be performed by one or more servers or a cloud-based system that communicates with one or more control systems or user devices.

The one or more processors 104 may include one or more microcontrollers, application specific integrated circuits (ASICs), field programmable gate arrays (FPGAs), central processing units (CPUs) having one or more processing cores, or other circuitry and logic configured to facilitate the operations of the computing device 102 in accordance with aspects of the present disclosure. The memory 106 may include random access memory (RAM) devices, read only memory (ROM) devices, erasable programmable ROM (EPROM), electrically erasable programmable ROM (EEPROM), one or more hard disk drives (HDDs), one or more solid state drives (SSDs), flash memory devices, network accessible storage (NAS) devices, or other memory devices configured to store data in a persistent or non-persistent state. Software configured to facilitate operations and functionality of the computing device 102 may be stored in the memory 106 as instructions 108 that, when executed by the one or more processors 104, cause the one or more processors 104 to perform one or more operations described herein with respect to the computing device 102, as described in more detail below. Additionally, the memory 106 may be configured to store data and information, such as the instructions 108.

The one or more communication interfaces 120 may be configured to communicatively couple the computing device 102 to one or more networks via wired or wireless communication links established according to one or more communication protocols or standards (e.g., an Ethernet protocol, a transmission control protocol/internet protocol (TCP/IP), an Institute of Electrical and Electronics Engineers (IEEE) 802.11 protocol, an IEEE 802.16 protocol, a 3rd Generation (3G) communication standard, a 4th Generation (4G)/long term evolution (LTE) communication standard, a 5th Generation (5G) communication standard, Bluetooth, Zigbee, and the like). In some implementations, the computing device 102 includes one or more input/output (I/O) devices that include one or more display devices, a keyboard, a stylus, one or more touchscreens, a mouse, a trackpad, a microphone, a camera, one or more speakers, haptic feedback devices, or other types of devices that enable a user to receive information from or provide information to the computing device 102. In some implementations, the computing device 102 is coupled to a display device, such as a monitor, a display (e.g., a liquid crystal display (LCD) or the like), a touch screen, a projector, a virtual reality (VR) display, an augmented reality (AR) display, an extended reality (XR) display, or the like. In some other implementations, the display device is included in or integrated in the computing device 102.

The hierarchy of devices 160 may include multiple tiers of devices. For example, the hierarchy of devices 160 may include a first tier 162, a second tier 172, and a third tier 180. In some examples, the first tier 162 may include one or more cloud devices 164, and the second tier 172 may include a first gateway 174 and a second gateway 176, and the third tier 180 may include a first device 182, a second device 184, a third device 186, and a fourth device 188 (also referred to herein as D1, D2, D3, and D4, respectively). In some implementations, the first tier 162 may correspond to a cloud infrastructure layer of the hierarchy of devices 160, the second tier 172 may correspond to a network and edge infrastructure layer of the hierarchy of devices 160, and the third tier 180 may correspond to an Internet-of-things (IoT) device layer. To further illustrate, in various examples, at least some components of the hierarchy of devices 160 may include or may be associated with one or more of an IoT device, a data repository, a cloud infrastructure, a network infrastructure, or a service. Other examples are also within the scope of the disclosure.

In some examples, the first gateway 174 may be coupled to the one or more cloud devices 164 via a first communication link L1, and the second gateway 176 may be coupled to the one or more cloud devices 164 via a second communication link L2. The first gateway 174 may be coupled to the second gateway 176 via a third communication link L3. The first device 182 and the second device 184 may be coupled to the first gateway 174 via a fourth communication link L4 and via a fifth communication link L5, respectively, and the third device 186 and the fourth device 188 may be coupled to the second gateway 176 via a sixth communication link L6 and a seventh communication link L7, respectively. In some examples, one or more of the communication links L4, L5, L6, and L7 may include a short-range communication link, such as a communication link of a local area network (LAN) or a wireless local area network (WLAN), as illustrative examples. In some examples, one or more of the communication links L1, L2, and L3 may include a long-range communication link, such as a communication link of a wide area network (WAN), a long-range WAN (LoRAWAN), or the Internet, as illustrative examples.

One or more devices of the hierarchy of devices 160 may each host, provide, execute, or otherwise participate in one or more services. For example, in some implementations, the first gateway 174 and the second gateway 176 may each execute or host a first service S1. As another example, the one or more cloud devices 164 may execute or host a second service S2. In some examples, the first service S1 is associated with a first computational load or power consumption, and the second service S2 may be associated with a second computational load or power consumption that is greater than the first computational load or power consumption.

It is noted that the examples of FIG. 1 are illustrative and that other examples are also within the scope of the disclosure. For example, the hierarchy of devices 160 may include a different number of tiers, such as two tiers or four tiers (or more). As another example, each tier of the hierarchy of devices 160 may include a different number of devices, a different type of one or more devices, or a combination thereof. For example, in some implementations, the third tier 180 may include five or more devices. As another example, in some implementations, the second tier 172 may include one or more servers (e.g., an edge server), such as if the second gateway 176 corresponds to an edge server.

During operation of the system 100, devices of the system 100 may perform operations, such as collecting, transmitting, receiving, and storing data, as an illustrative example. In some implementations, one or more devices of the third tier 180 may use the services S1 and S2 (e.g., by issuing requests for the services S1 and S2). For example, in some implementations, one or more devices of the third tier 180 may correspond to IoT devices (such as IoT sensors of a wireless sensor network (WSN) or other network) that collect and transmit data to the one or more cloud devices 164 via one or more of the first gateway 174 or the second gateway 176. To further illustrate, the first service S1 may be a distributed sensor measurement service and the second service S2 may be a home automation service, as non-limiting examples. Transmission of data to the one or more cloud devices 164 via one or more of the first gateway 174 or the second gateway 176 may correspond to a request to access or use of any of the services S1, S2. For example, the first service S1 may support one or more of receiving data from a device of the third tier 180 or relaying of the data to the one or more cloud devices 164, and the second service S2 may support one or more of receiving the data, processing the data, storing the data, or controlling one or more parameters of the device, such as by controlling one or more of a duty cycle or a mode of operation of the device.

In some examples, the services S1, S2 may be associated with a particular request servicing rate of servicing requests from the devices 182, 184, 186, and 188 of the third tier 180. To illustrate, Table 1 provides certain illustrative examples of particular request servicing rates that may be associated with devices of the third tier 180. Other examples are also within the scope of the disclosure.

TABLE 1

| | Request servicing rate associated with D1 | Request servicing rate associated with D2 | Request servicing rate associated with D3 | Request servicing rate associated with D4 |
|---|---|---|---|---|
| S1 | 2 requests/ minute | 2 requests/ minute (r/min) | 4 requests/ minute | 4 requests/ minute |
| S2 | 1 request/ minute | 1 r/min | 2 requests/ minute | 1 request/ minute |

The computing device 102 may receive information related to operation of the hierarchy of devices 160. For example, the computing device 102 may receive historical metadata 140 associated with the hierarchy of devices 160. In some examples, the computing device 102 may receive the historical metadata 140 from one or more devices of the hierarchy of devices 160 via the one or more communication interfaces 120 and may input the historical metadata 140 to the one or more processors 104. The historical metadata 140 may be generated by or otherwise output during operation of the hierarchy of devices 160, and may indicate operational information, performance information, other information, or a combination thereof, associated with the hierarchy of devices 160. The historical metadata 140 may include historical metadata (e.g., metadata recorded during past time periods of monitoring) and currently-generated metadata, as further described herein. In some examples, the historical metadata 140 may indicate one or more parameters associated with the hierarchy of devices 160. To illustrate, the historical metadata 140 may indicate one or more of a component identifier (ID) 142 associated with at least one device or other feature of the hierarchy of devices 160, a geographic location 144 associated with the at least one device, a timestamp 146 of an event associated with the at least one device, a request servicing rate 148 associated with the at least one device, a request servicing error rate 150 associated with the at least one device, a request servicing duration 152 associated with the at least one device, or a resource utilization 154 associated with the at least one device, as illustrative examples.

To further illustrate, Table 2 illustrates certain examples of parameters that may be indicated by the historical metadata 140. In Table 2, each row may correspond to a failure event indicated by the historical metadata 140. For example, Table 2 indicates that the first gateway 174 and the first service S1 may be associated with a failure event at time T_n, a failure event at time T_(n−1), and a failure event at time T_1, where TO indicates a particular time, and where T_n indicates an offset of n from the particular time (e.g., where n indicates a time interval, such as a number of milliseconds). The data indicated in the example of Table 2 may be stored in the metadata repository 124. It is noted that the examples of Table 2 are provided for illustration and that other examples are also within the scope of the disclosure.

TABLE 2

| Component ID 142 | Geographic Location 144 | Timestamp 146 | Request Servicing Rate 148 | Request Servicing Error Rate 150 | Request Servicing Duration 152 | Resource Utilization 154 |
|---|---|---|---|---|---|---|
| First Gateway 174 | Actual geographic location | T_n | 100 r/min | 0.001 | 100 milli-seconds (ms) | 30% |
| First Gateway 174 | Actual geographic location | T_(n-1) | 150 r/min | 0.001 | 125 ms | 35% |
| First Gateway 174 | Actual geographic location | T_1 | 110 r/min | 0.001 | 105 ms | 32% |
| S1 | First Gateway 174 | T_n | 50 r/min | 1% | 900 ms | N/A |
| S1 | First Gateway 174 | T_(n-1) | 65 r/min | 1.4% | 980 ms | N/A |
| S1 | First Gateway 174 | T1 | 55 r/min | 2.65% | 1950 ms | N/A |

The one or more processors 104 may receive the historical metadata 140 and may provide the historical metadata 140 as training data to the one or more ML applications of the FMEA engine 122 to train the one or more ML applications to identify failure modes that correspond to input metadata. The identified failure modes may include a plurality of failure modes 128 associated with the hierarchy of devices 160 and identified based on the training data. For example, the training data may be labeled such that each portion of metadata that corresponds to one of the plurality of failure modes 128 is tagged with the appropriate label. In some examples, the plurality of failure modes 128 may include at least one of a delay associated with a response to a request (e.g., a request to the first service S1 or the second service S2), a failure to respond to the request, an erroneous response to the request, a crash event, a hardware failure event, or a disruption of communication through a communication link (e.g., any of the communication links L1, L2, L3, L4, L5, L6, and L7). The FMEA engine 122 may also be configured to identify a plurality of recovery processes 130 associated with the plurality of failure modes 128 and the hierarchy of devices 160. For example, each recovery process of the plurality of recovery processes 130 may be associated with recovery from one or more failure modes of the plurality of failure modes 128. In some examples, the FMEA engine 122 may store the historical metadata 140 (or portions thereof) to a metadata repository 124 and may store indications of the plurality of failure modes 128 and associated information to a failure mode database 126.

To further illustrate, the one or more ML applications of the FMEA engine 122 may be trained to analyze contexts represented by input metadata to identify a corresponding failure mode or multiple failure modes. In some examples, the contexts may be associated with a location of an error event or a recovery from the error event, a time of an error event or a recovery from the error event, and one or more components associated with the error event or a recovery from the error event. In some examples, at least some components of the hierarchy of devices 160 may be represented by a set of attributes, where each attribute may be represented by a name and by a value. During training, the one or more ML applications of the FMEA engine 122 may process the historical metadata 140 (or portions thereof) to analyze one or more of a number of requests served by the component per unit of time, a number of failed requests of the component per unit of time, an amount of time the component takes to process a request, or a resource utilization associated with the component (e.g., a percentage of system resources used by the component). The plurality of failure modes 128 may be categorized based on or more of a response time of a component to respond to a request, an unavailability of a component to respond to a request, an erroneous response to a request by a component, or a crash of a component (e.g., due to a hardware failure).

In some implementations, after identifying failure modes based on input metadata, the FMEA engine 122 may determine a priority scheme 134 associated with the plurality of failure modes 128. The priority scheme 134 may indicate a plurality of risk priority numbers (RPNs) 136 associated with the plurality of failure modes 128, such that the priority scheme 134 an ordering of the plurality of failure modes 128 from more risky to less risky (or vice versa). In some examples, the plurality of RPNs 136 may enable the computing device 102 to identify one or more failure modes of the plurality of failure modes 128 for enhanced monitoring (e.g., for "fine-grained" monitoring or increased monitoring of a high-risk failure mode). More specifically, enhanced monitoring may refer to higher frequency monitoring (e.g., shorter intervals between determinations or evaluations, as described in more detail below) as compared to standard or default monitoring. To illustrate, the FMEA engine 122 may be trained to generate and maintain a knowledgebase 132 associated with one or more of the plurality of failure modes 128. As an example, the FMEA engine 122 may generate the knowledgebase 132 (or one or more entries thereof) for a particular failure mode 110 based on an RPN associated with the particular failure mode 110 exceeding a threshold RPN. In some examples, the knowledgebase 132 may be represented using a model, such as a Gaussian distribution model. In some examples, a failure mode for enhanced monitoring may be selected based on one or more of user input or a quantitative risk analysis.

In some implementations, the plurality of RPNs 136 may be based on one or more of a severity associated with a failure mode, a probability of occurrence associated with a failure mode, or a detectability metric associated with a failure mode. To illustrate, the plurality of RPNs 136 may include at least a first RPN associated with the particular failure mode 110. The first RPN may be based on one or more of a severity value 137 associated with the particular failure mode 110, a probability of occurrence 138 associated with the particular failure mode 110, or a detectability metric 139 associated with the particular failure mode 110.

In some examples, the plurality of RPNs 136 may be determined based on Equation 1 below, in which w_sever indicates a weight associated with the severity value 137, w_prob indicates a weight associated with the probability of occurrence 138, and w_detect indicates a weight associated with the detectability metric 139. In an illustrative example, w_sever=2, w_prob=1, and w_detect=1. Other examples are also within the scope of the disclosure. Additionally or alternatively, one or more of w_sever, w_prob, or w_detect may be modified dynamically during operation of the system 100.

$$RPN = (\text{w\_server} * \text{severity}) * (\text{w\_prob} * \text{probability}) * (\text{w\_detect} * \text{detectability}) \quad \text{Equation 1}$$

In some implementations, the severity value 137 may be based on one or more of a number of occurrences of the particular failure mode 110, a recovery time (e.g., an average recovery time) associated with recovering from the particular failure mode 110, a data loss event associated with the particular failure mode 110, a loss of functionality associated with the particular failure mode 110, or a rate of occurrence associated with the particular failure mode 110. In some examples, the severity value 137 may be determined based on Equation 2 below, in which severity indicates the severity value 137, n indicates the number of occurrences, a indicates the recovery time, loss_data indicates an amount of data loss associated with the data loss event, and loss_junction indicates an amount of the loss of functionality.

$$\text{severity} = (n) * (a) + ((\text{loss\_data} * \text{loss\_function}) * \text{rate}) \quad \text{Equation 2}$$

In some examples, the number of occurrences and the recovery time may be determined based on the historical metadata 140 (or portions thereof). In some examples, the amount of data loss and the amount of the loss of functionality may be selected from (or estimated based on) Table 3 and Table 4, respectively. To illustrate, in the examples of Table 3 and Table 4, for a service (such as the first service S1 or the second service S2) that is experiencing a delay, loss_data=1, and loss_function=3. Other examples are also within the scope of the disclosure. In some examples, Tables 3 and 4 may be determined (or populated) using data related to the hierarchy of devices 160.

TABLE 3

| Component | Delay | Unavailability | Erroneous Response | Crash |
|---|---|---|---|---|
| IoT Device | 1 | 1 | 1 | 3 |
| Data Repository | 3 | 5 | 5 | 3 |
| Cloud Infrastructure | 3 | 3 | 3 | 5 |
| Network Infrastructure | 3 | 3 | 3 | 5 |
| Services | 1 | 3 | 5 | 3 |

TABLE 4

| Component | Delay | Unavailability | Erroneous Response | Crash |
|---|---|---|---|---|
| IoT Device | 1 | 1 | 1 | 3 |
| Data Repository | 3 | 3 | 3 | 3 |
| Cloud Infrastructure | 3 | 5 | 3 | 5 |
| Network Infrastructure | 3 | 5 | 3 | 5 |
| Services | 3 | 3 | 5 | 5 |

In some examples, the severity value 137 may be scaled within a range. For example, the range may correspond to range of [1, 5]. In some examples, the severity value 137 is scaled according to Equation 3 below, in which scaled_value corresponds to the severity value 137 after scaling, calculated_value corresponds to the severity value 137, and max_value corresponds to a maximum calculated value of the severity value 137.

$$\text{scaled\_value} = 5 * (\text{calculated\_value} / \text{max\_value}) \quad \text{Equation 3}$$

The probability of occurrence 138 associated with the particular failure mode 110 may be based on one or more of a number of occurrences of the particular failure mode 110 or a total number of occurrences among the plurality of failure modes 128. For example, the probability of occurrence 138 may correspond to or may be based on a ratio of the number of occurrences of the particular failure mode 110 to the total number of occurrences among the plurality of failure modes 128. In some examples, a default value of the number of occurrences may correspond to one. In some examples, the probability of occurrence 138 may be scaled within a range. For example, the range may correspond to range of [1, 5]. In some examples, the probability of occurrence 138 is scaled according to the example of Equation 3, where scaled_value, calculated_value, and max_value correspond to values derived from the probability of occurrence 138.

The detectability metric 139 may be based on one or more of an accuracy associated with a detection model associated with the particular failure mode 110 or an error tolerance value associated with the detection model. For example, the detectability metric 139 may be determined based on the example of Equation 4 below, in which detectability indicates the detectability metric 139, accuracy indicates the accuracy associated with the detection model, max_error indicates the error tolerance value associated with the detection model, and weight_d indicates a weighting value. In some examples, weight_d=5 or another value. In some examples, max_error may be application-specific, user-specified, or both. In an illustrative example, max_error=25, and a "minimum" value of the accuracy associated with the detection model may correspond to accuracy=75%. Other examples are also within the scope of the disclosure.

$$\text{detectability} = \text{weight\_d} * (100 - \text{accuracy}) / \text{max\_error} \quad \text{Equation 4}$$

In some examples, the detectability metric 139 may be scaled according to the example of Equation 3, where scaled_value, calculated_value, and max_value are derived from the detectability metric 139.

In some examples, the FMEA engine 122 may maintain a data structure associated with each failure mode of the plurality of failure modes 128, such as in the failure mode database 126. The data structure may be based at least in part on the plurality of RPNs 136. For example, the data structure may include or correspond to a tuple data structure that indicates a name or ID associated with each failure mode, a timestamp associated with occurrence of each failure mode, and an RPN associated with each failure mode.

In some implementations, the FMEA engine 122 may be configured to determine correlations among the plurality of failure modes 128. The correlations may be determined using one or more statistical techniques to compare or correlate the relationship between the failure modes. In some implementations, the correlations may be determined based on comparisons or relationships between one or more features or parameters corresponding to each of the failure modes. For example, the correlations may be based on one or more of a component associated with each failure mode of the plurality of failure modes 128, a geographic location associated with each failure mode of the plurality of failure modes 128, or a timestamp associated with each failure mode of the plurality of failure modes 128.

The computing device 102 may receive an indication of a failure event associated with the hierarchy of devices 160. To illustrate, the failure event may include at least one of a delay associated with a response to a request (e.g., a request to the first service S1 or the second service S2), a failure to respond to the request, an erroneous response to the request, a crash event, a hardware failure event, or a disruption of communication through a communication link (e.g., any of the communication links L1, L2, L3, L4, L5, L6, and L7). In some examples, the indication of the failure event includes or corresponds to second metadata, such as current metadata 156 (e.g., unlabeled metadata) associated with the hierarchy of devices 160. For example, the current metadata 156 may be associated with a current state of the hierarchy of devices 160 occurring after a state associated with the historical metadata 140. In some examples, the current metadata 156 may include metadata corresponding to the historical metadata 140 based on the current state of the hierarchy of devices 160, such as a time that is after a time associated with the historical metadata 140 In some examples, the current metadata 156 may include one or more of an opcode associated with the failure event, a component ID associated with the failure event, a geographic location associated with the failure event, or a timestamp of the failure event, as illustrative examples.

The one or more processors 104 may receive the current metadata 156 and may provide the current metadata 156 to the FMEA engine 122. In some examples, the FMEA engine 122 may identify that the failure event associated with the current metadata 156 corresponds to a particular failure mode of the plurality of failure modes 128, such as the particular failure mode 110 or another failure mode. For example, the FMEA engine 122 may correlate one or more parameters associated with the current metadata 156 to one or more parameters associated with the particular failure mode 110 (e.g., to "match" the current metadata 156 to the particular failure mode 110). To further illustrate, the FMEA engine 122 may identify that the particular failure mode 110 corresponds to (e.g., correlates with) one or more contexts or parameters indicated by the current metadata 156.

After identifying the particular failure mode 110, the FMEA engine 122 may identify one or more recovery processes of the plurality of recovery processes 130 associated with recovery from the particular failure mode 110.

For example, the FMEA engine 122 may determine a particular recovery process 159 of the plurality of recovery processes 130 based on the particular failure mode 110. To illustrate, by analyzing historical metadata or additional data monitored during resolution of failure modes associated with the historical metadata, the FMEA engine 122 may generate and maintain a listing (e.g., a database, etc.) of the plurality of recovery processes 130. Based on the particular failure mode 110, the FMEA engine 122 may identify candidate recovery processes 112 that may mitigate or resolve one or more effects of the particular failure mode 110, and the FMEA engine 122 may select (e.g., determine) a particular recovery process 159 to mitigate one or more effects of the particular failure mode 110. In some examples, the FMEA engine 122 may access, based on particular failure mode 110, one or more of the metadata repository 124 or the knowledgebase 132 to identify the particular recovery process 159. In some examples, the FMEA engine 122 may estimate the efficiency of the candidate recovery processes 112 for recovery from the particular failure mode 110 and may compare the candidate recovery processes 112 based on the estimated efficiencies. The FMEA engine 122 may identify the particular recovery process 159 from among the candidate recovery processes 112 based on an estimated efficiency of the particular recovery process 159 exceeding other estimated efficiencies. The FMEA engine 122 may output an indication of the particular recovery process 159 to the one or more processors 104. For example, the FMEA engine 122 may predict efficiency scores corresponding to the candidate recovery processes 112 and may select the particular recovery process 159 from among the candidate recovery processes 112 based on the efficiency scores.

To further illustrate, in an illustrative example, the particular failure mode 110 may include or correspond to a failure event associated with the first communication link L1, such as a delay associated with the first communication link L1, or a frequency of delays associated with the first communication link L1 exceeding a threshold. In some such examples, the metadata used to identify the particular failure mode 110 may correspond to an indication of timing out of a request or message to be transmitted via the first communication link L1, or a bounce-back notification indicating that the first communication link L1 is unavailable, as illustrative examples. Due to the failure event associated with the first communication link L1, the first gateway 174 may be temporarily unable to access the second service S2.

The FMEA engine 122 may identify the multiple candidate recovery processes 112 to address a failure event, such as the failure event associated with the first communication link L1. To illustrate, in a first candidate recovery process of the multiple candidate recovery processes 112, the first gateway 174 may access the service S2 via the third communication link L3, via the second gateway 176, and via the second communication link L2. In a second candidate recovery process of the multiple candidate recovery processes 112, the first gateway 174 may host both the first service S1 and the second service S2. In a third candidate recovery process of the multiple candidate recovery processes 112, the first gateway 174 may host the second service S2, the second gateway 176 may host the first service S1, and the first gateway 174 may access the first service S1 via the third communication link L3 and via the second gateway 176.

The FMEA engine 122 may select the particular recovery process 159 from among the multiple candidate recovery processes 112. To select among the multiple candidate recovery processes 112, FMEA engine 122 may access, based on the particular failure mode 110 or the input metadata, data from one or more of the metadata repository 124 or the knowledgebase 132. The data may include or correspond to the example data illustrated in Table 5 and Table 6 below.

TABLE 5

| Component | Timestamp | Utilization | Timestamp | Utilization |
|---|---|---|---|---|
| First gateway 174 | T_i | 55% | T_k | 65% |
| Second gateway 176 | | 45% | | 60% |
| L1 | | 60% | | 30% |
| L2 | | 70% | | 45% |

TABLE 6

| Service | Timestamp | Rate (r/min) | Timestamp | Rate (r/min) |
|---|---|---|---|---|
| S1 (First gateway 174) | T_i | 4 | T_k | 2 |
| S1 (Second gateway 176) | | 5 | | 3 |
| S2 (First gateway 174) | | 2 | | 2 |
| S2 (Second gateway 176) | | 4 | | 3 |

Further, the FMEA engine 122 may select among the multiple candidate recovery processes 112 based on one or both of the examples of Tables 7 and 8 below, which may be based on different operational states of the hierarchy of devices 160 at times T_i and T_k, respectively.

TABLE 7

| Timestamp | Candidate Recovery Process | Technical Advantage | Technical Disadvantage | Recom-mendation |
|---|---|---|---|---|
| T_i | First Candidate Recovery Process | No increase of load for first gateway 174 | Heavy increase of load for L3; heavy increase of delay for D1, D2, D3, and D4 | No |
| | Second Candidate Recovery Process | No change for second gateway 176, D3, and D4 | Heavy increase of load for first gateway 174; heavy increase of delay for D1 and D2 | No |
| | Third Candidate Recovery Process | Intermediate increase of load for first gateway 174; marginal increase of delay for D1 and D2 | Marginal increase of load for second gateway 176 | Yes |

TABLE 8

| Timestamp | Candidate Recovery Process | Technical Advantage | Technical Disadvantage | Recommendation |
|---|---|---|---|---|
| T_k | First Candidate Recovery Process | No increase of load for first gateway 174; marginal increase of load for L2 | Marginal increase of delay for D1, D2, D3, and D4 | Yes |
| | Second Candidate Recovery Process | No change for second gateway 176, D3, and D4 | Heavy increase of load for first gateway 174; heavy increase of delay for D1 and D2 | No |
| | Third Candidate Recovery Process | Marginal increase of delay for D1 and D2 | Heavy increase of load for second gateway 176; heavy increase of load for first gateway 174 | No |

In some examples, if the particular recovery process 159 is to be implemented at time T_i, the FMEA engine 122 may select the third candidate recovery process as the particular recovery process 159 and recommend the third candidate recovery process to the one or more processors 104. In some other examples, if the particular recovery process 159 is to be implemented at time T_k, the FMEA engine 122 may select the first candidate recovery process as the particular recovery process 159 and recommend the first candidate recovery process to the one or more processors 104.

In some examples, the FMEA engine 122 may access metadata profiles stored at the metadata repository 124 to select among the multiple candidate recovery processes 112. For example, the FMEA engine 122 may access a first metadata profile 114 associated with a first metadata profile 114 associated with the particular recovery process 159 and may access a second metadata profile 116 associated with a second recovery process of the multiple candidate recovery processes 112. The FMEA engine 122 may select the particular recovery process 159 from among the multiple candidate recovery processes 112 based on the first metadata profile 114 and further based on the second metadata profile 116. In some examples, the metadata profiles 114, 116 may indicate one or more aspects described with reference to Tables 5-8.

To illustrate, FMEA engine 122 may select the particular recovery process 159 based on the first metadata profile 114 indicating that a first load increase associated with the particular recovery process 159 is less than a second load increase associated with the second recovery process. Alternatively or in addition, the FMEA engine 122 may select the particular recovery process 159 based on the first metadata profile 114 indicating that a first delay increase associated with the particular recovery process 159 is less than a second delay increase associated with the second recovery process.

After identifying the particular recovery process 159, the FMEA engine 122 may output an indication of the particular recovery process 159 to the one or more processors 104. Further, although some examples are described in terms of the FMEA engine 122 recommending a single recovery process 159 to the one or more processors 104, in some other examples, the FMEA engine 122 may recommend multiple recovery processes of the plurality of recovery processes 130 and that are associated with the particular failure mode 110. For example, in some cases, the FMEA engine 122 may determine that the multiple candidate recovery processes 112 are "tied" (e.g., where the multiple candidate recovery processes 112 have similar technical advantages and technical disadvantages). In some other examples, the FMEA engine 122 may recommend implementing multiple different recovery processes (e.g., concurrently or sequentially). To further illustrate, the particular recovery process 159 may include multiple recovery processes performed to resolve the particular failure mode 110, such as by performing both reselection from one device to another device and reselection from one communication link to another communication link, as an illustrative example.

The one or more processors 104 may output a message 158 indicating the particular recovery process 159. In some examples, the computing device 102 transmits the message 158 (e.g., via the one or more communication interfaces 120) to one or more devices of the hierarchy of devices 160 to indicate the particular recovery process 159 to the one or more devices. Additionally or alternatively, the one or more processors 104 may automatically initiate one or more operations of the particular recovery process 159 at one or more devices of the hierarchy of devices 160 to mitigate an effect of the particular failure mode 110. To illustrate, in some implementations, the message 158 may include instructions to devices of the hierarchy of devices 160 to initiate one or more operations to mitigate an effect of the particular failure mode 110, and thus may represent a portion of an automated recovery process initiated by the computing device 102. For example, the instructions may include an instruction to be executed by the devices to cause performance of the one or more operations, such as selecting or reselecting a communication link or a device for performance of a service, as illustrative examples. To further illustrate, in some examples, the one or more operations include one or more of selecting among a first communication link (e.g., one of the communication links L1, L2, L3, L4, L5, L6, and L7) and a second communication link (e.g., another of the communication links L1, L2, L3, L4, L5, L6, and L7) for data transmission, selecting among the first communication link and the second communication link for data reception, selecting among a first device (e.g., any of the one or more cloud devices 164, the first gateway 174, the second gateway 176, or the devices 182, 184, 186, and 188) and a second device (e.g., another of the one or more cloud devices 164, the first gateway 174, the second gateway 176, or the devices 182, 184, 186, and 188) for performance of a first service (e.g., one of the services S1, S2), or selecting from the first service and a second service (e.g., the other of the services S1, S2).

To illustrate, if the particular failure mode 110 includes a failure associated with the first communication link L1, the particular recovery process 159 may include selecting among the first communication link L1 and the second communication link L2 (e.g., by rerouting one or more messages to the second gateway 176 to be transmitted via the second communication link L2 instead of the first communication link L1). As another example, if the particular failure mode 110 includes a failure associated with the first gateway 174, the particular recovery process 159 may include selecting among the first gateway 174 and the second gateway 176 (e.g., by performing the first service S1 using the second gateway 176 instead of using the first gateway 174). Other examples are also within the scope of the disclosure.

During the particular recovery process 159, the computing device 102 may monitor performance of the particular recovery process 159. The computing device 102 may monitor a failover time associated with particular recovery process 159, which may include or correspond to a time to mitigate the effects of the particular failure mode 110. Further, the computing device 102 may monitor a mean time between two successive occurrences of the particular failure mode 110.

To further illustrate, in some aspects, the system 100 may facilitate an implementation of a context-specific, data-driven, and dynamic FMEA for a cloud continuum application. The system 100 may capture various characteristics of the plurality of failure modes 128 through context-specific and data driven analysis. Further, the system 100 may dynamically observe changes of the plurality of failure modes 128 over time.

The system 100 may be associated with a context specific FMEA performed by the FMEA engine 122. The system 100 may identify various context-specific information for the FMEA engine 122 and may analyze the plurality of failure modes 128 based on the contexts. The identified contexts may be specified by spatial information, temporal information, and the categories of the components of a cloud continuum application, which may be indicated by the historical metadata 140.

The system 100 may support a data-driven FMEA (e.g., the FMEA engine 122). For example, the system 100 may capture the historical metadata 140 and may use the historical metadata 140 for quantified risk analysis of the plurality of failure modes 128. Such a data-driven analysis may be used to make the FMEA engine 122 specific to the particular application or deployment associated with the hierarchy of devices 160.

The system 100 may perform dynamic monitoring of the plurality of failure modes 128. For example, the system 100 may monitor the effects of the plurality of failure modes 128 and changes over various contexts over time. Further, the system 100 may dynamically modify an FMEA process according to the risk profiles of the plurality of failure modes 128 (e.g., according to the priority scheme 134).

The system 100 may perform reactive analysis of failure recovery processes. For example, the system 100 may generate a knowledgebase (e.g., the knowledgebase 132) from observed metadata to perform FMEA and to analyze the plurality of recovery processes 130. After detecting the particular failure mode 110, the system 100 may approximate or estimate the efficiencies of the recovery processes of the particular failure mode 110 (e.g., using the knowledgebase and other metadata) and may recommend an efficient recovery process, which may be determined or estimated to be efficient at that time instant. The recovery process may be recommended to the observed application in a reactive manner.

In some aspects of the disclosure, the system 100 may perform or enable dynamic monitoring and evaluation of failure modes of a cloud continuum application. For example, the system 100 may perform on-the-fly adoptions to changes of system parameters, such as data ingestion rates, data processing rates, data types, and selection of data analytics processes. The system 100 may identify the changes in system parameters based on contexts and changes-of-context associated with the cloud continuum application. Further, due to the dynamic monitoring, a type and granularity of an output of the system 100 may vary over time. The system 100 may recommend efficient recovery processes by estimating and comparing the efficiencies of different candidate recovery processes, such as based on a knowledgebase that is determined at least in part on the metadata.

To further illustrate, the system 100 may be selectively configured (or "customized") based on the particular context information associated with a cloud continuum application, such as the particular number or type of devices included in the hierarchy of devices or the particular number or type of communication links associated with the hierarchy of devices. The system 100 may perform data-driven failure analysis and quantified risk analysis of the plurality of failure modes and may be application and deployment specific in some implementations. Further, the system 100 may be dynamically modified based on risk factors of the plurality failure modes, such as by identifying a higher risk failure mode and tagging the higher risk failure mode for enhanced monitoring. The system 100 may analyze the plurality of recovery processes to recommend an efficient recovery process based at least in part on the particular time or operating state associated with the observed failure event or the proposed recovery process. For example, the system 100 may recommend a recovery process that results in less of an increase in computational load (or no increase in computational load) as compared to one or more other candidate recovery processes. As another example, the system 100 may recommend a recovery process that results in less of an increase in latency or delay (or no increase in latency or delay) as compared to one or more other candidate recovery processes.

An example process performed by the system 100 may include identifying context information. The process may further include categorizing the components of a cloud continuum application into multiple categories. The process may further include observing components of the cloud continuum application based on multiple selected metrics. The process may further include capturing metadata (e.g., the historical metadata 140) for performing FMEA based on the identified context information. The process may also include periodically performing FMEA from the collected metadata and generating a quantified FMEA that may be application specific and deployment specific. The process may further include generating a knowledgebase (e.g., the knowledgebase 132) for analyzing the performance of the application and the FMEA. Based on the latest FMEA, the system 100 may prioritize failure modes (e.g., the plurality of failure modes 128) according to risk factors of the failure modes (e.g., according to the plurality of RPNs 136). One or more high-risk failure modes may be identified for enhanced monitoring. The system 100 may monitor the evolution of the failure modes over time and may perform FMEA to capture such changes. The system 100 may also analyze recovery processes of the failure modes. The system 100 may reactively recommend appropriate recovery process (such as any of the plurality of recovery processes 130) of a failure mode (e.g., the particular failure mode 110) at a particular time based on the knowledgebase and collected metadata.

One or more features described with reference to FIG. 1 may improve system operation as compared to one or more conventional techniques. For example, by training the one or more ML applications of the FMEA engine 122 based on the historical metadata 140 using one or more techniques described herein, and by comparing efficiencies of multiple candidate recovery processes (e.g., for a particular time or operating state of the hierarchy of devices 160), recovery from the particular failure mode 110 may be enhanced. To illustrate, recovery may be enhanced by recommending a particular recovery process 159 that results in less of an increase in computational load or latency as compared to one or more other candidate recovery processes.

Figure 2:
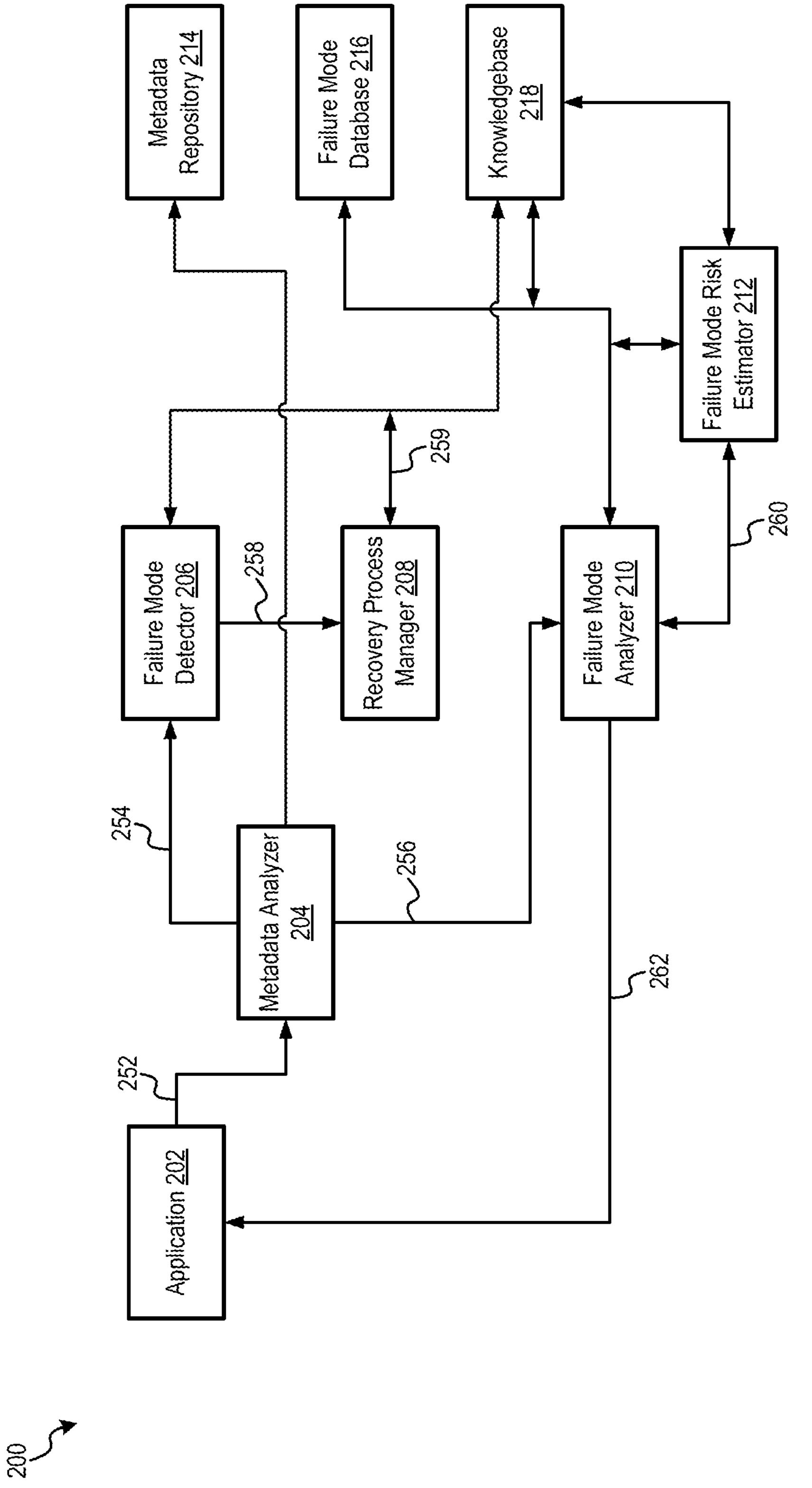
FIG. 2 is a diagram of another example of a system that supports failure mode identification and recovery process recommendation associated with a cloud computing application according to one or more aspects.

Referring to FIG. 2, an example of a system that supports failure mode identification and recovery process recommendation associated with a cloud computing application failure mode according to one or more aspects is shown as a system 200. As shown in FIG. 2, the system 100 may include an application 202, a metadata analyzer 204, a failure mode detector 206, a recovery process manager 208, a failure mode analyzer 210, a failure mode risk estimator 212, a metadata repository 214 (e.g., the metadata repository 124 of FIG. 1), a failure mode database 216 (e.g., the failure mode database 126 of FIG. 1), and a knowledgebase 218 (e.g., the knowledgebase 132 of FIG. 1).

In some examples, one or more components illustrated in FIG. 2 may be included in the system 100 of FIG. 1. For example, the application 202 may be executed by one or more of the computing device 102 or one or more devices of the hierarchy of devices 160. For example, the application 202 may include a cloud continuum application, such as a cloud continuum application associated with the hierarchy of devices 160 of FIG. 1. In some examples, the FMEA engine 122 include one or more of the metadata analyzer 204, the failure mode detector 206, the recovery process manager 208, the failure mode analyzer 210, the failure mode risk estimator 212, the metadata repository 214, the failure mode database 216, or the knowledgebase 218.

During operation, the metadata analyzer 204 may obtain or receive metadata from the application 202, at 252. For example, the metadata may include or correspond to the historical metadata 140 of FIG. 1. The metadata analyzer 204 may process the metadata and may share the processed metadata with the failure mode detector 206, at 254. Further, the metadata analyzer 204 may share the processed metadata with the failure mode analyzer 210, at 256. The failure mode detector 206 may detect failure mode(s) based on the processed metadata and may share failure mode detection information with the recovery process manager 208, at 258. The recovery process manager 208 may determine one or more recovery processes to initiate based on the failure mode detection information and may share the determined recovery processes, at 259. The failure mode analyzer 210 may analyze the processed metadata to determine risks associated with failure modes and may share failure mode risk information with the failure mode risk estimator 212, at 260. The failure mode analyzer 210 may share failure mode knowledge models with the application 202, at 262. One or more other connections illustrated in FIG. 2 may correspond to operations performed using one or more of the metadata repository 214, the failure mode database 216, or the knowledgebase 218 (e.g., by storing results or other data to one or more of the metadata repository 214, the failure mode database 216, or the knowledgebase 218 or retrieving information from the various sources for performance of one or more operations, such as detecting a failure mode or determining risk information, as non-limiting examples).

Referring to FIG. 3, an example of data that supports failure mode identification and recovery process recommendation associated with a cloud computing application failure mode according to one or more aspects is shown as data 300. In some examples, the FMEA engine 122 may be trained based on the historical metadata 140 and/or otherwise configured to output the data 300 to the one or more processors 104 of FIG. 1. In some examples, operations described with reference to FIG. 3 may be performed by the computing device 102 of FIG. 1.

The data 300 illustrates that a device, service, or other feature (which may referred to generally as a "component") associated with the hierarchy of devices 160 may be associated with one or more parameters. For example, the data 300 illustrates example parameters that may be associated with the first gateway 174, the first service S1 hosted by the first gateway 174, the first service S1 hosted by the second gateway 176, the second service S2, the fourth communication link L4, and the fifth communication link L5. The example parameters may include one or more of a component ID 302 (e.g., the component ID 142), a timestamp 304 (e.g., the timestamp 146), a component category 306, a highest priority failure mode 308 (e.g., the particular failure mode 110 or another failure mode of the plurality of failure modes 128) of each component, an RPN 310 (e.g., an RPN of the RPNs 136) associated with the highest priority failure mode 308, a short-term trend 312, a long-term trend 322, or a high-priority trend 332.

Each component described with reference to the data 300 may be associated with one or more failure modes of the plurality of failure modes 128 of FIG. 1. Further, each failure mode associated with a component may be associated with a respective RPN of the RPNs 136 of FIG. 1. To illustrate, the fourth communication link L4 may experience one or more of an unavailability or a delay, each of which may correspond to a respective failure mode of the plurality of failure modes 128, and each of which may be associated with a respective RPN of the RPNs 136.

In some examples, failure modes associated with a component may be ranked according to one or more parameters to identify the highest priority failure mode 308 of the failure modes associated with the component. For example, the highest priority failure mode 308 associated with a component may be identified based on failure mode types of the failure modes associated with the component. To illustrate, for a service (such as the second service S2), a delay may correspond to the highest priority failure mode 308 of the service, and for a communication link (such as the fourth communication link L4 or the fifth communication link L5), unavailability may correspond to the highest priority failure mode 308 of the communication link.

Alternatively or in addition, the highest priority failure mode 308 associated with a component may be identified based on the RPNs of failure modes associated with the component. For example, the failure mode having the highest RPN among failure modes of the component may be selected as the highest priority failure mode 308, and the RPN may be selected as the RPN 310. As an illustrative example, the unavailability associated with the fourth communication link L4 may be associated with an RPN of 82, and the delay associated with the fourth communication link L4 may be associated with an RPN of 50. In such examples, the unavailability may be selected as the highest priority failure mode 308 of the fourth communication link L4, and the RPN of 82 may be selected as the RPN 310 associated with the highest priority failure mode 308.

The FMEA engine 122 may determine trends associated with the plurality of failure modes 128 based on multiple time intervals (also referred to as time horizons or time windows). The trends may include one or more of the short-term trend 312, the long-term trend 322, or the high-priority trend 332. In some implementations, each trend associated with the data 300 may be associated with (e.g., derived from or calculated using) a frequency and a mean time between failures (MTBF). Each frequency and MTBF may be represented or indicated using Gaussian distribution model having a format of (x, y), where x indicates a mean value of the Gaussian distribution model, and where y indicates a variance of the Gaussian distribution model.

To further illustrate, the FMEA engine 122 may determine a first trend associated with the particular failure mode 110 based on evaluation of subsets of the metadata using a first time interval. The FMEA engine 122 may determine a second trend associated with the particular failure mode 110 based on the first trend (e.g., by aggregating data associated with the first trend). The second trend may be associated with a second time interval greater than the first time interval. For example, the first time interval may correspond to a day or a portion of a day, and the second time interval may correspond to a time interval of more than a day or more than the portion of the day. In some examples, the first trend corresponds to the short-term trend 312, and the second trend corresponds to the long-term trend 322. In some examples, the first trend may be associated with a first frequency of occurrence of the particular failure mode 110 and with a first MTBF. The second trend may be associated with a second frequency of occurrence of the particular failure mode 110 and with a second MTBF.

In some examples, a difference between a short-term trend 312 of a failure mode and a long-term trend 322 of the failure mode may exceed a threshold. Based on the difference exceeding the threshold, the failure mode may be subject to enhanced monitoring (e.g., for "fine-grained" monitoring), which may include determining a high-priority trend 332 associated with the failure mode. Failure modes identified for enhanced monitoring may be indicated in FIG. 3 using cross-hatching. To illustrate, in FIG. 3, the short-term trend 312 of the delay associated with the first gateway 174 is less than the long-term trend 322 of the delay associated with the first gateway 174. Further, in FIG. 3, the short-term trend 312 of the delay associated with the second service S2 is less than the long-term trend 322 of the delay associated with the second service S2. As a result, the delay associated with the first gateway 174 and the delay associated with the second service S2 may be selected for enhanced monitoring.

Alternatively or in addition, a failure mode associated with an RPN 310 exceeding an RPN threshold may be subject to enhanced monitoring (e.g., for "fine-grained" monitoring). For example, at time T_i, the delay associated with the first gateway 174 and the delay associated with the second service S2 may be associated with an RPN 310 of 140 and an RPN 310 of 112, respectively. As another example, at time T_(i+1), the delay associated with the first gateway 174 and the delay associated with the second service S2 may be associated with an RPN 310 of 142 and an RPN 310 of 108, respectively. In some implementations, RPNs 310 of 140, 112, 142, and 108 may exceed the RPN threshold. As a non-limiting example, the RPN threshold may correspond to 100.

In some examples, performing the enhanced monitoring for a failure mode may include performing one or more additional operations as compared to other failure modes (which may be associated with "default" monitoring). For example, the one or more additional operations for a failure mode may include determining a high-priority trend 332 associated with the failure mode. Determining the high-priority trend 332 may include determining a frequency and MTBF using a third time interval that is different than the first time interval and the second time interval.

The computing device 102 of FIG. 1 may use one or more trends indicated by the data 300 (such as one or more of the short-term trend 312, the long-term trend 322, or the high-priority trend 332) in connection with monitoring of the hierarchy of devices 160. For example, a higher variance associated with a failure mode may indicate volatility of collected data, which may cause the computing device 102 to collect additional historical metadata 140 for the failure mode or to re-analyze the historical metadata 140 for one or more errors or anomalies associated with the failure mode. In some cases, a difference between a short-term trend 312 and a long-term trend 322 associated with a failure mode may cause the computing device 102 to initiate enhanced monitoring of the failure mode. A lower volatility of a high-priority trend 332 may indicate a greater reliability of collected data as compared to a high-priority trend 332 associated with a greater volatility.

To further illustrate some examples, Table 9 illustrates an example of trend data that may be generated by the FMEA engine 122. In some examples, data illustrated in Table 9 may be stored at a knowledgebase, such as the knowledgebase 132.

TABLE 9

| Component ID 142 | Trend Type | Request Servicing Rate 148 | Request Servicing Error Rate 150 | Request Servicing Duration 152 | Resource Utilization 154 |
|---|---|---|---|---|---|
| First gateway 174 | Short-term trend 312 | 125 r/min | 0.001 | 112.5 ms | 32.5% |
| First gateway 174 | Long-term trend 322 | 115 r/min | 0.001 | 105.5 ms | 32.0% |
| S1 (First gateway 174) | Short-term trend 312 | 57.5 r/min | 1.2% | 725 ms | N/A |
| S1 (First gateway 174) | Long-term trend 322 | 55.5 r/min | 1.92% | 1125 ms | N/A |

The example of Table 9 illustrates that different components may be associated with different parameters for the short-term trend 312 and for the long-term trend 322. For example, one or more of the request servicing rate 148, the request servicing error rate 150, the request servicing duration 152, or the resource utilization 154 of FIG. 1 may differ among the short-term trend 312 and the long-term trend 322.

One or more features described with reference to FIG. 3 may improve system operation as compared to one or more conventional techniques. For example, by using multiple time horizons to identify trends of different scales in the historical metadata 140, data analytics may be enhanced, such as by identifying a higher risk failure mode for enhanced monitoring.

Figure 4:
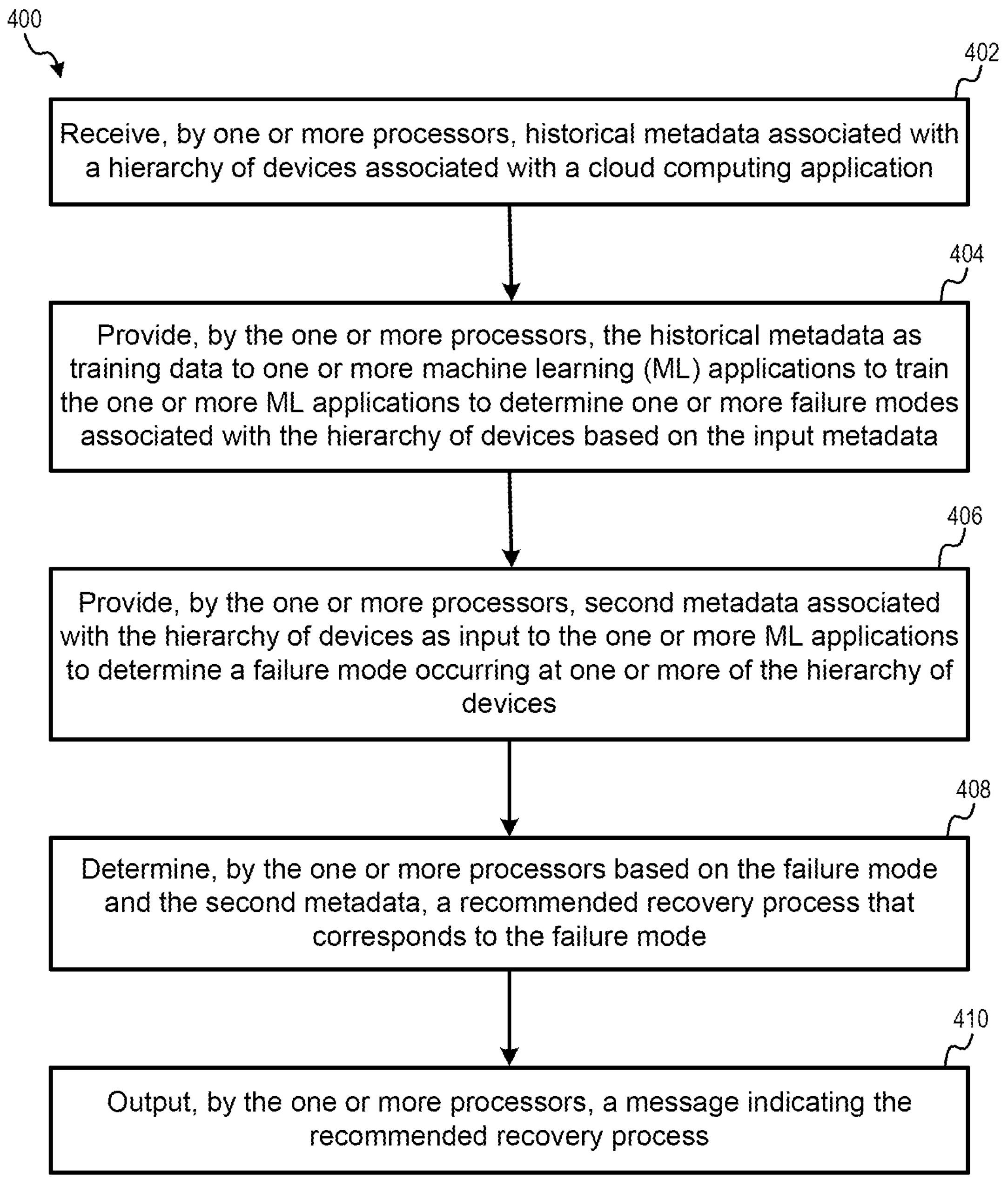
FIG. 4 is a flow diagram illustrating an example of a method for failure mode identification and recovery process recommendation associated with a cloud computing application according to one or more aspects.

Referring to FIG. 4, a flow diagram of an example of a method for failure mode identification and recovery process recommendation associated with a cloud computing application failure mode is shown as a method 400. In some implementations, the operations of the method 400 may be stored as instructions that, when executed by one or more processors (e.g., the one or more processors of a computing device or a server, such as the one or more processors 104), cause the one or more processors to perform the operations of the method 400. In some implementations, the method 400 may be performed by a computing device, such as the computing device 102 of FIG. 1, the system 200 of FIG. 2, or a combination thereof.

The method 400 includes receiving, by one or more processors, historical metadata associated with a hierarchy of devices associated with a cloud computing application, at 402. For example, the one or more processors 104 may receive the historical metadata 140 associated with the hierarchy of devices 160.

The method 400 further includes providing, by the one or more processors, the historical metadata as training data to one or more ML applications to train the one or more ML applications to determine one or more failure modes associated with the hierarchy of devices based on the input metadata, at 404. For example, the one or more processors 104 may provide the historical metadata 140 to the one or more ML applications of the FMEA engine 122 to train the one or more ML applications to identify the plurality of failure modes 128 and to train the plurality of ML applications to identify the plurality of recovery processes 130.

The method 400 further includes providing, by the one or more processors, second metadata associated with the hierarchy of devices as input to the one or more ML applications to determine a failure mode occurring at one or more of the hierarchy of devices, at 406. For example, the one or more processors 104 may receive the current metadata 156 associated with a failure event corresponding to the particular failure mode 110 and may provide the current metadata 156 to the FMEA engine 122 to determine the particular recovery process 159.

The method 400 further includes determining, by the one or more processors based on the failure mode and the second metadata, a recommended recovery process that corresponds to the failure mode, at 408. For example, the one or more processors 104 may determine the particular recovery process 159 based on the particular failure mode 110 and the current metadata 156.

The method 400 further includes outputting, by the one or more processors, a message indicating the recommended recovery process, at 410. For example, the one or more processors 104 may output the message 158 indicating the particular recovery process 159.

As described above, the method 400 supports determining a recovery process associated with a cloud computing application failure mode. For example, by training the one or more ML applications of the FMEA engine 122 based on the historical metadata 140 using one or more techniques described herein, recovery may be enhanced by recommending a particular recovery process 159 that results in less of an increase in computational load or latency as compared to one or more other candidate recovery processes.

In some examples, a device (e.g., the computing device 102 or the system 200) for determining a recovery process associated with a cloud computing application failure mode includes a memory (e.g., the memory 106) and one or more processors (e.g., the one or more processors 104) communicatively coupled to the memory. The one or more processors may be configured to perform one or more operations described with reference to the method 400 of FIG. 4.

In some examples, a non-transitory computer-readable storage medium storing instructions that, when executed by one or more processors, cause the one or more processors to perform operations for determining a recovery process associated with a cloud computing application failure mode. The operations may include one or more operations described with reference to the method 400 of FIG. 4.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

One or more components, functional blocks, and modules described herein with respect to FIGS. 1-4 may include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits, and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. In some implementations, a processor may also be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media can include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, hard disk, solid state disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed aspect, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and processes described in the specification. As one of ordinary skill in the art will readily appreciate from the present disclosure, processes, machines, manufacture, compositions of matter, means, methods, or operations, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or operations.

What is claimed is:

1. A method for determining a recovery process associated with a cloud computing application failure mode, the method comprising:

receiving, by one or more processors, historical metadata associated with a hierarchy of devices associated with a cloud computing application;

providing, by the one or more processors, the historical metadata as training data to one or more machine learning (ML) applications to train the one or more ML applications to determine one or more failure modes associated with the hierarchy of devices based on input metadata;

providing, by the one or more processors, second metadata associated with the hierarchy of devices as input to the one or more ML applications to determine a failure mode occurring at one or more of the hierarchy of devices;

determining, by the one or more processors based on the failure mode and the second metadata, a recommended recovery process that corresponds to the failure mode;

outputting, by the one or more processors, a message indicating the recommended recovery process;

predicting, by the one or more processors, efficiency scores corresponding to multiple candidate recovery processes associated with the failure mode; and selecting, by the one or more processors, the recommended recovery process from among the multiple candidate recovery processes based on the efficiency scores, wherein the recommended recovery process is selected from among the multiple candidate recovery processes based on a first metadata profile associated with the recommended recovery process and further based on a second metadata profile associated with a second recovery process of the multiple candidate recovery processes.

2. The method of claim 1, further comprising automatically initiating, by the one or more processors, one or more operations of the recommended recovery process at one or more devices of the hierarchy of devices to mitigate an effect of the failure mode.

3. The method of claim 2, wherein the one or more operations include one or more of:

selecting among a first communication link and a second communication link for data transmission;

selecting among the first communication link and the second communication link for data reception;

selecting among a first device and a second device for performance of a first service; or selecting among the first service and a second service.

4. The method of claim 1, wherein the one or more failure modes include at least one of a delay associated with a response to a request, a failure to respond to the request, an erroneous response to the request, a crash event, a hardware failure event, or a disruption of communication through a communication link.

5. The method of claim 1, wherein the recommended recovery process is selected based on the first metadata profile indicating that a first load increase associated with the recommended recovery process is less than a second load increase associated with the second recovery process.

6. The method of claim 1, wherein the recommended recovery process is selected based on the first metadata profile indicating that a first delay increase associated with the recommended recovery process is less than a second delay increase associated with the second recovery process.

7. A device for determining a recovery process associated with a cloud computing application failure mode, the device comprising:

a memory; and one or more processors communicatively coupled to the memory, the one or more processors configured to:

receive historical metadata associated with a hierarchy of devices associated with a cloud computing application;

provide the historical metadata as training data to one or more machine learning (ML) applications to train the one or more ML applications to determine one or more failure modes associated with the hierarchy of devices based on input metadata;

provide second metadata associated with the hierarchy of devices as input to the one or more ML applications to determine a failure mode occurring at one or more of the hierarchy of devices;

determine, based on the failure mode and the second metadata, a recommended recovery process that corresponds to the failure mode; and output a message indicating the recommended recovery process;

predict efficiency scores corresponding to multiple candidate recovery processes associated with the failure mode; and select the recommended recovery process from among the multiple candidate recovery processes based on the efficiency scores, wherein the recommended recovery process is selected from among the multiple candidate recovery processes based on a first metadata profile associated with the recommended recovery process and further based on a second metadata profile associated with a second recovery process of the multiple candidate recovery processes.

8. The device of claim 7, wherein the historical metadata indicates one or more of a component identifier associated with at least one device of the hierarchy of devices, a geographic location associated with the at least one device, a timestamp of an event associated with the at least one device, a request servicing rate associated with the at least one device, a request servicing error rate associated with the at least one device, a request servicing duration associated with the at least one device, or a resource utilization associated with the at least one device.

9. The device of claim 7, wherein the one or more processors are further configured to determine a priority scheme that indicates a plurality of risk priority numbers (RPNs) associated with the one or more failure modes.

10. The device of claim 9, wherein the one or more processors are further configured to generate a knowledge-base associated with the failure mode based on an RPN of the plurality of RPNs associated with the failure mode exceeding a threshold RPN.

11. The device of claim 9, wherein:

the plurality of RPNs includes at least a first RPN associated with the failure mode, and the first RPN is based on one or more of a severity value associated with the failure mode, a probability of occurrence associated with the failure mode, or a detectability metric associated with the failure mode.

12. The device of claim 11, wherein the severity value associated with the failure mode is based on one or more of a number of occurrences of the failure mode, a recovery time associated with recovering from the failure mode, a data loss event associated with the failure mode, a loss of functionality associated with the failure mode, or a rate of occurrence associated with the failure mode.

13. The device of claim 11, wherein the probability of occurrence associated with the failure mode is based on one or more of a number of occurrences of the failure mode or a total number of occurrences among the one or more failure modes.

14. The device of claim 11, wherein the detectability metric is based on one or more of an accuracy associated with a detection model associated with the failure mode or an error tolerance value associated with the detection model.

15. A non-transitory computer-readable storage medium storing instructions that, when executed by one or more processors, cause the one or more processors to perform operations for determining a recovery process associated with a cloud computing application failure mode, the operations comprising:

receiving, by one or more processors, historical metadata associated with a hierarchy of devices associated with a cloud computing application;

providing, by the one or more processors, the historical metadata as training data to one or more machine learning (ML) applications to train the one or more ML applications to determine one or more failure modes associated with the hierarchy of devices based on input metadata;

providing, by the one or more processors, second metadata associated with the hierarchy of devices as input to the one or more ML applications to determine a failure mode occurring at one or more of the hierarchy of devices;

determining, by the one or more processors based on the failure mode and the second metadata, a recommended recovery process that corresponds to the failure mode; and outputting, by the one or more processors, a message indicating the recommended recovery process;

predicting, by the one or more processors, efficiency scores corresponding to multiple candidate recovery processes associated with the failure mode; and selecting, by the one or more processors, the recommended recovery process from among the multiple candidate recovery processes based on the efficiency scores, wherein the recommended recovery process is selected from among the multiple candidate recovery processes based on a first metadata profile associated with the recommended recovery process and further based on a second metadata profile associated with a second recovery process of the multiple candidate recovery processes.

16. The non-transitory computer-readable storage medium of claim 15, wherein the operations further comprise:

determining a first trend associated with the failure mode based on evaluation of subsets of the historical metadata using a first time interval; and determining a second trend associated with the failure mode based on the first trend, the second trend associated with a second time interval greater than the first time interval.

17. The non-transitory computer-readable storage medium of claim 16, wherein:

the first trend is associated with a first frequency of occurrence of the failure mode and with a first mean time between failures (MTBF), and the second trend is associated with a second frequency of occurrence of the failure mode and with a second MTBF.

18. The non-transitory computer-readable storage medium of claim 15, wherein:

the cloud computing application includes a cloud continuum application, and the one or more ML applications are integrated in a failure mode effect analysis (FMEA) engine.

* * * * *